United States Patent
Bates et al.

(10) Patent No.: US 6,741,680 B2
(45) Date of Patent: May 25, 2004

(54) TELEPHONE MESSAGE SYSTEM WITH FLEXIBLE PRESENTATION CAPABILITY

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 09/746,883

(22) Filed: Dec. 22, 2000

(65) Prior Publication Data

US 2002/0080928 A1 Jun. 27, 2002

(51) Int. Cl.$^7$ ............................................... H04M 1/64
(52) U.S. Cl. ............................ 379/88.22; 379/88.19; 379/88.21
(58) Field of Search ..................... 379/67.1, 88.01, 379/88.08, 88.11, 88.19, 88.2, 88.21, 88.22, 88.23, 142.01, 142.06, 88.04

(56) References Cited

U.S. PATENT DOCUMENTS

| | | | | |
|---|---|---|---|---|
| 5,283,818 A | * | 2/1994 | Klausner et al. | 379/88.25 |
| 5,504,805 A | * | 4/1996 | Lee | 379/88.03 |
| 6,229,878 B1 | * | 5/2001 | Moganti | 379/67.1 |
| 6,335,962 B1 | * | 1/2002 | Ali et al. | 379/88.11 |
| 6,359,970 B1 | * | 3/2002 | Burgess | 379/67.1 |
| 6,438,215 B1 | * | 8/2002 | Skladman et al. | 379/67.1 |
| 6,480,579 B2 | * | 11/2002 | Hijii | 379/67.1 |
| 6,493,431 B1 | * | 12/2002 | Troen-Krasnow et al. | 379/88.12 |
| 2002/0027976 A1 | * | 3/2002 | Wilcox et al. | 379/67.1 |
| 2002/0067804 A1 | * | 6/2002 | Hijii | 379/67.1 |

* cited by examiner

Primary Examiner—Scott L. Weaver
(74) Attorney, Agent, or Firm—Roy W. Truelson

(57) ABSTRACT

A telephone message system identifies a caller with an incoming message, and sorts messages according to caller identifying information for presentation to the user. Preferably, messages are grouped according to the caller's telephone number, but may alternatively be grouped using voice recognition technology. When a user plays back a large number of messages, all messages from the same number or person will be grouped together, making it easier to follow a chain of messages. The user may optionally prioritize message groups, either explicitly of by letting the system assign a priority.

17 Claims, 8 Drawing Sheets

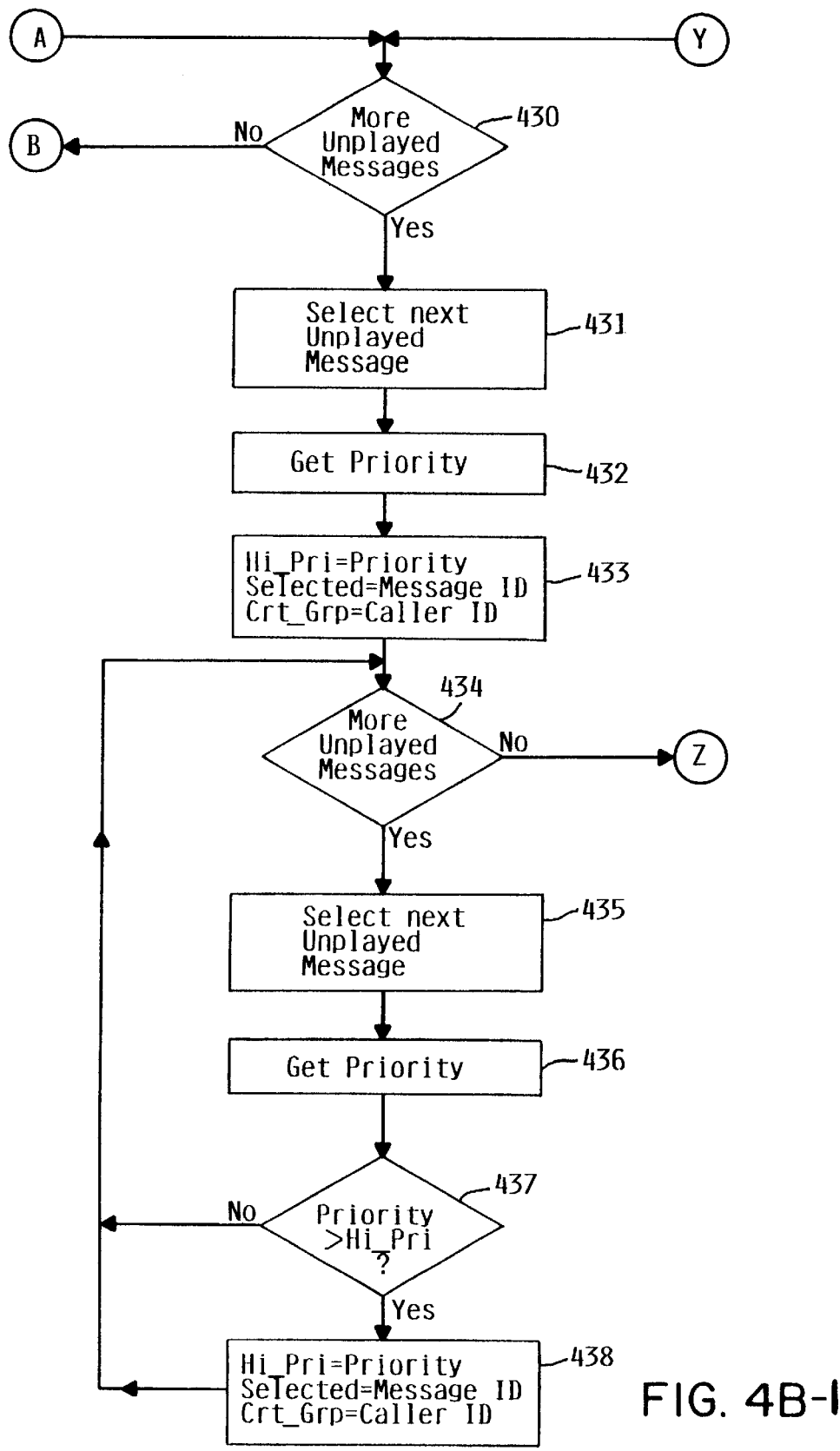
FIG. 4B-I

TELEPHONE MESSAGE SYSTEM WITH FLEXIBLE PRESENTATION CAPABILITY

FIELD OF THE INVENTION

The present invention relates to telephone answering message systems, and in particular to message systems of the type that include digital data processors for recording and playback of telephonic messages.

BACKGROUND OF THE INVENTION

The latter half of the twentieth century has been witness to a phenomenon known as the information revolution. While the information revolution is often associated with general purpose digital computers, digital data processing technology has been incorporated into an ever increasing variety of applications, including automobiles, home appliances, medical devices, security devices, etc. The list is almost endless.

One application for digital technology is in telephone answering message systems. A conventional telephone message system typically contains a telephonic interface and a data storage for storing multiple audible messages. The telephonic interface listens on the telephone line for an incoming call. If the call is not intercepted by a user (call recipient) after a predetermined time, the answering machine takes over the line and plays a pre-recorded message to the caller. The caller is then allowed to record a spoken message for the call recipient on the answering machine. Various function buttons or switches permit the call recipient (user) to retrieve (play back) or delete the message at a later time. Such a message system is often a self-contained device which attaches to a single telephone line, but it may also be a larger device such as a computer, which services multiple telephone lines and stores messages for multiple users, each of whom accesses the messages by using appropriate buttons on a local telephone receiver.

Many individuals receive a large number of such messages on their telephone message systems. The number of messages to deal with can be particularly large if the user has been away from the system (e.g., on vacation or out of town on business) for any length of time. It can be inconvenient for a user to wade through a large number of messages.

Many answering machines offer the user the capability to access the machine remotely to hear messages. As useful as this capability is, it offers only limited alleviation of the problem. Remote access may be difficult or impossible due to the user's schedule or other factors. Remote access may be expensive; often it will only be possible from a hotel room at the end of the day, where phone charges are very high. But even without these problems, the user must still listen in sequence to a lot of messages, and make mental connections between some messages which are out of sequence.

Older self-contained answering machines were basically tape recorders with a few switches for telephonic interface. Most modem self-contained message systems use semiconductor memory for message storage, and have on-board digital processors which may support a variety of functions. Such machines are, in fact, small, limited-function computers. Yet even modem message systems have tended to mimic the capabilities of their older, tape recorder based counterparts, making limited use of digital technology. An unappreciated need exists to provide improved function in telephone message systems, and in particular, to enhance the capability of the user to manage multiple stored messages.

SUMMARY OF THE INVENTION

A telephone answering message system identifies a caller with an incoming message. Messages are sorted electronically according to caller identifying information. A user may listen to messages in the sorted order, rather than in a time sequential order.

In the preferred embodiment, messages are grouped according to the caller's telephone number. I.e., multiple messages from the same telephone number are grouped together for playback. The message system may optionally identify a caller using voice recognition technology, or a combination of voice recognition technology and calling number. Thus, when a user plays back a large number of messages, all messages from the same telephone number or person will be grouped together, making it easier to follow a chain of messages.

The user may optionally prioritize message groupings. Specifically, the user may define certain calling numbers or voices as having a higher priority for response. During playback, messages in such groupings are played back first, in the order of established priority. Alternatively, the system may automatically assign a priority based on frequency of calling and/or receiving calls from a particular number.

A message for which no priority has been set, or which originates from a telephone number which has blocked its caller ID function, will typically be assigned a low priority, and will be played back last. Often, such calls originate from telemarketers.

Additional features provided include the ability to delete an entire group of messages or a single message within a group, to skip over one message or an entire group of messages, or to select a particular ID (telephone number) and play all the messages associated with that number.

A telephone answering machine as described herein thus provides improved capability to manage multiple telephone messages. The ability to prioritize messages can be particularly important when retrieving messages remotely, thus allowing the user to abort the remote call after listening to the most important messages, saving time and money for the user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
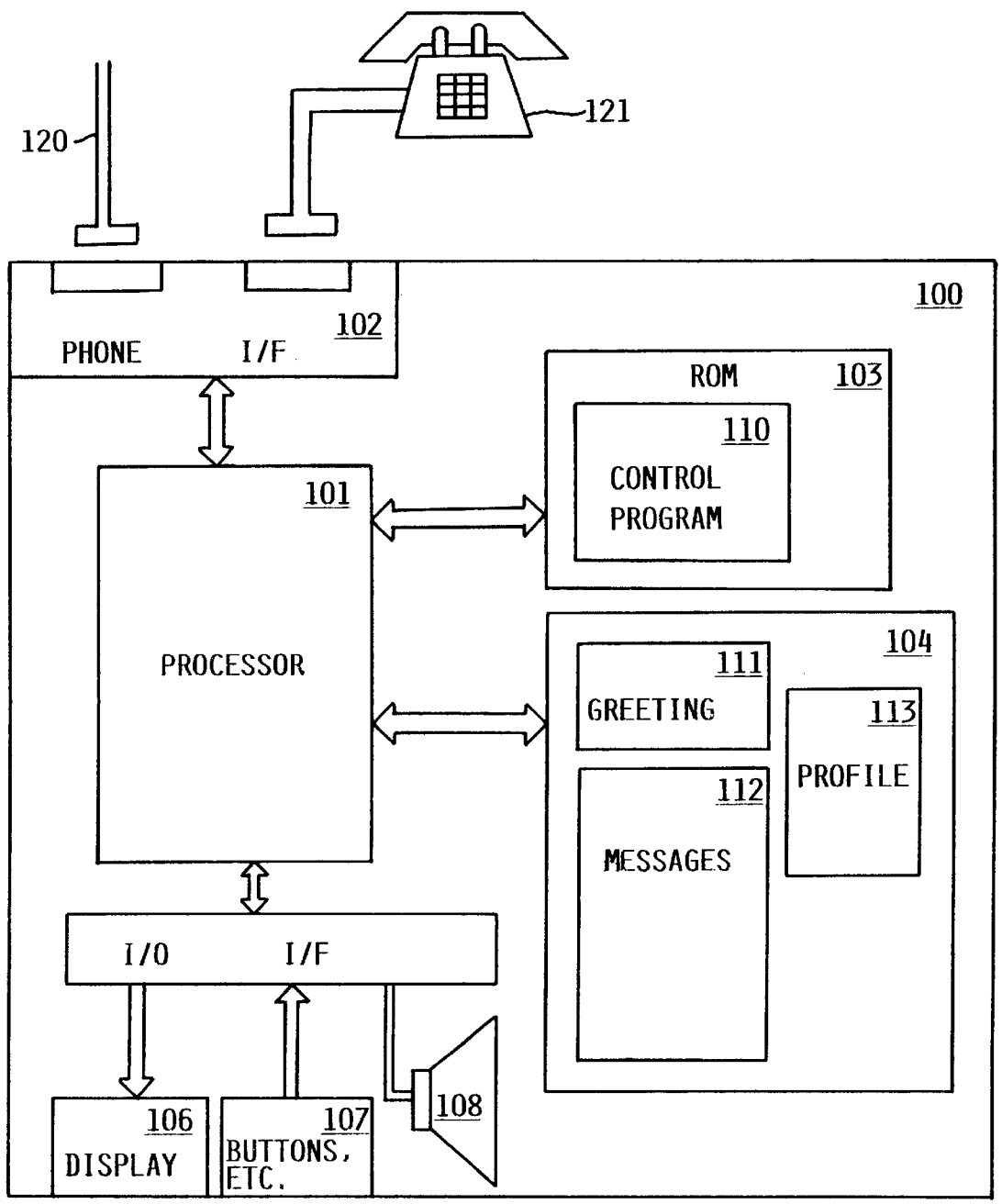
FIG. 1 is a block diagram illustrating the major components of a telephone message system, according to the preferred embodiment of the present invention.

Referring to the drawing, wherein like numbers denote like parts throughout the several views, FIG. 1 is a high-level block diagram illustrating the major components of a telephone answering message system which may be used to support flexible message presentation, according to the preferred embodiment of the present invention. Message system 100 includes programmable processor 101, telephone line interface 102, non-volatile semiconductor read-only memory (ROM)103, read/write semiconductor random access memory (RAM)104, and I/O device interface 105. Processor 101 executes control program 110 stored in ROM 103 to control the operation of message system 100. Telephone interface 102 includes a jack for receiving an incoming telephone line 120, a jack for an outgoing telephone line connected to a telephone 121, and control electronics for taking control of the telephone line in response to an incoming signal. Telephone interface further includes hardware for converting a telephone signal to appropriate digital form for storage and playback on telephone system 100. RAM 104 is used for storing volatile data; it includes a greeting file 111 containing one or more pre-recorded voice greetings to be played over the telephone line to a caller when the user does not intercept the telephone call; message in file 112 containing voice messages left for the user by callers; and sorting profile 113 containing data used to sort messages for playback, as further described herein. I/O device interface 105 provides an interface to various I/O devices within message system 100. Such I/O devices preferably include a display 106, such as a light emitting diode (LED) or liquid crystal diode (LCD) display, for displaying system status; a plurality of buttons and switches 107 for user input and selection; and a speaker 108 for audibly playing stored messages to the user.

While message system 100 is shown in FIG. 1 with a separate external telephone 121 attached via an outgoing telephone port in telephone interface 102, it will be understood that message system 100 could contain an integral telephone handset.

Figure 2:
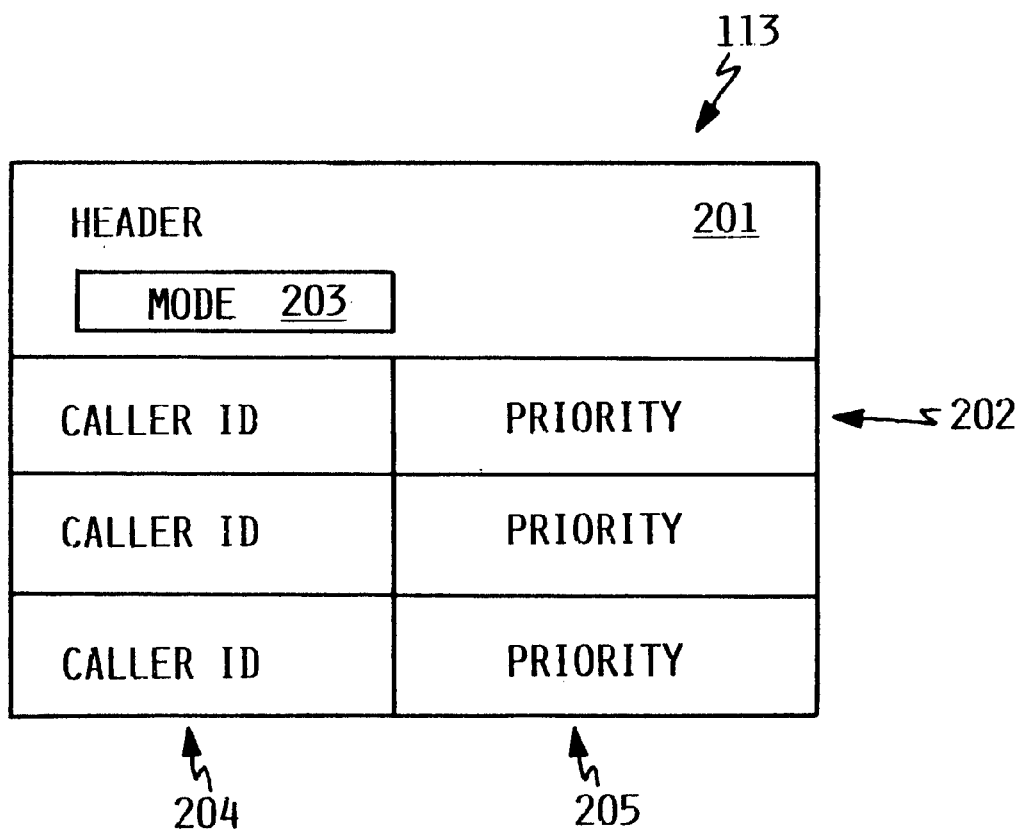
FIG. 2 shows the structure of a sorting profile used to control sorting of message for presentation, according to the preferred embodiment.

FIG. 2 shows the structure of sorting profile 113, which is used to control sorting of message for presentation, according to the preferred embodiment. Sorting profile contains a header 201 and a variable number of caller entries 202. The header includes a mode field 203 which identifies a sorting mode for playback of messages recorded in the message system, and may contain additional fields such as profile length specifying the length of profile 113, etc. Each caller entry 202 contains a caller ID field 204 and a priority field 205.

In the preferred embodiment, five operational modes are defined for playback of stored messages. The current mode is determined by the value in the mode field 203 of sorting profile 113. The mode values and their meanings are as follows:

Sequential: All messages are played back in chronological order

Grouped: Messages are grouped according to the caller's identifier, with the group having the oldest message being played first.

Grouped prioritized: Messages are grouped according to the caller's identifier, with the group having the highest user-assigned priority being played first.

Grouped auto prioritized: Similar to grouped prioritized, but the system automatically determines priority, without the need for user assignment.

Prioritized: Messages are played back in the order of user-assigned priority, without grouping by caller ID.

Priority field 205 is preferably an integer, which may be assigned by the user or may be determined by the system. When operating in Grouped auto prioritized mode, the system determines a priority for messages of each caller, as follows. Priority field is effectively a counter, which is incremented and decremented. The priority is incremented each time a call from the corresponding caller is sensed on telephone line 120. The priority is further incremented each time an outgoing telephone call is made from the user's line to the telephone number of the corresponding caller. Although the amount of increments may be the same in the two cases, preferably an outgoing call results in a larger increment. An incoming call indicates that the caller desires to talk to the user, but the reverse is not definitely indicated, whereas an outgoing call indicates definite interest on the part of the user, and is therefore a surer indication of higher priority. In order to age the priority numbers, the system periodically reduces all priorities by a pre-determined amount. While different formulae can be used, in an example embodiment the system increments priority by 1 for each incoming call, increments priority by 5 for each outgoing call, and divides all priorities in half every month to age the priority information. If the division results in a priority of less than 1, the corresponding caller entry 202 is deleted from profile 113, so that caller entries do not accumulate indefinitely. Messages from unidentified callers (i.e., those who have blocked the caller ID function on their telephones, so that a called party can not identify the source of the call) are assigned a priority of 0. It will be understood that there are many possible variations in the way in which a system may automatically assign priority to messages. Specifically, the system may take into account other or additional factors than the frequency of calling or receiving calls from a particular number. E.g., the system may take into account the lengths of messages.

In the preferred embodiment, caller ID field 205 in each caller entry 202 contains the telephone number of the caller. This number is obtained from a caller ID signal received over telephone line 120. However, caller ID field 205 could alternatively contain any data which would be used to identify a source of a message. For example, it would alternatively be possible to identify the caller using voice recognition techniques. In this case, a caller ID field could contain a voice sample, or some data abstracted from a voice sample from which it would be possible to identify the caller. Caller identification using voice recognition has the advantage of identifying a caller personally, regardless of where the call originated. It will be appreciated that, since the present invention involves sorting of messages for presentation, an acceptable message system could tolerate some inaccuracy in caller identification using voice recognition techniques.

In the preferred embodiment, one of the caller entries 202 in sorting profile 113 is used for unidentified callers, i.e., callers who have blocked the caller ID function. By default, the priority of this entry is 0, but it may be assigned a different priority by the user.

Figures 1, 3A:
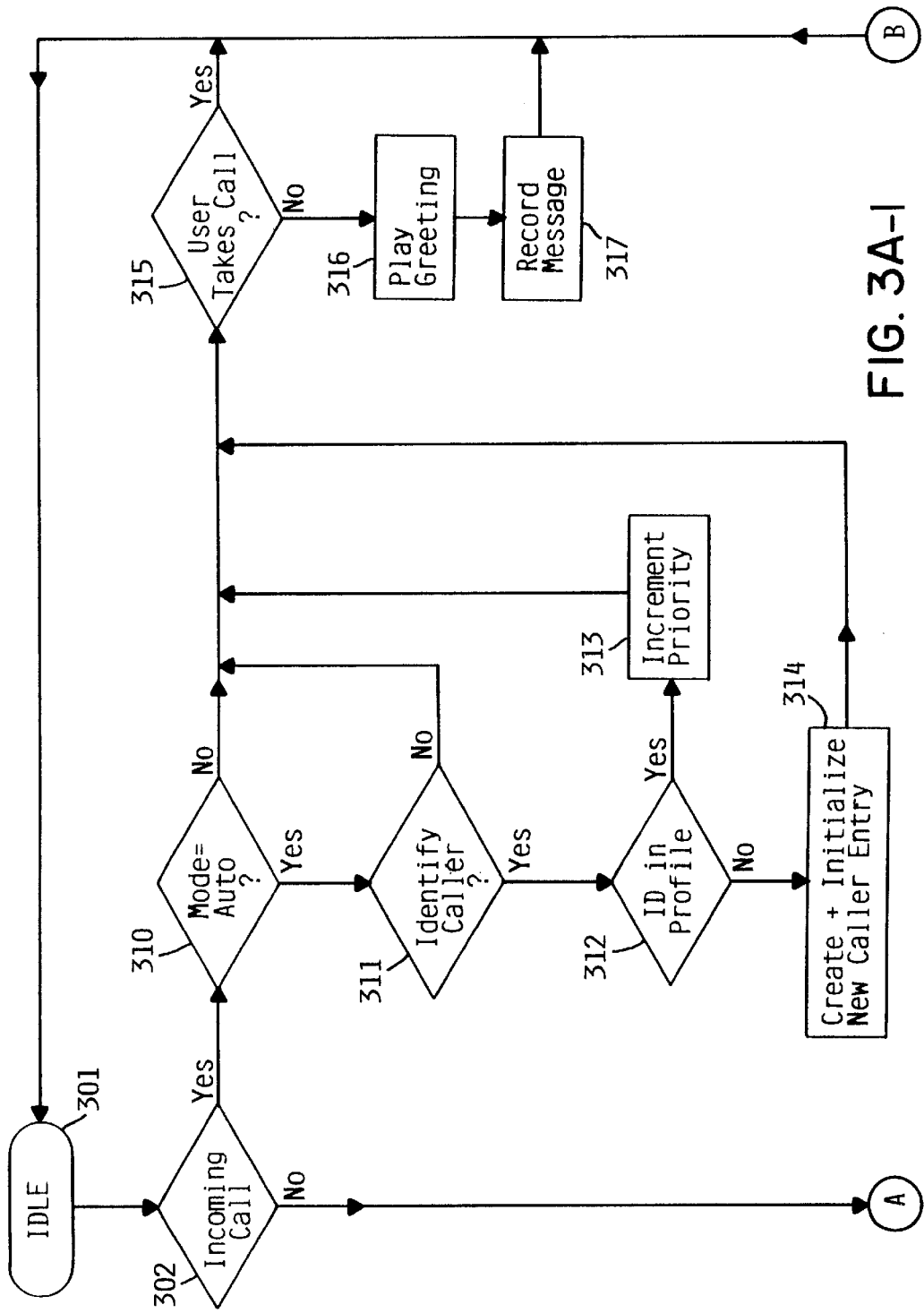
FIGS. 3A and 3B are a flowchart showing the operation at a high level of the system's control program, according to the preferred embodiment.
Figures 2, 3A:
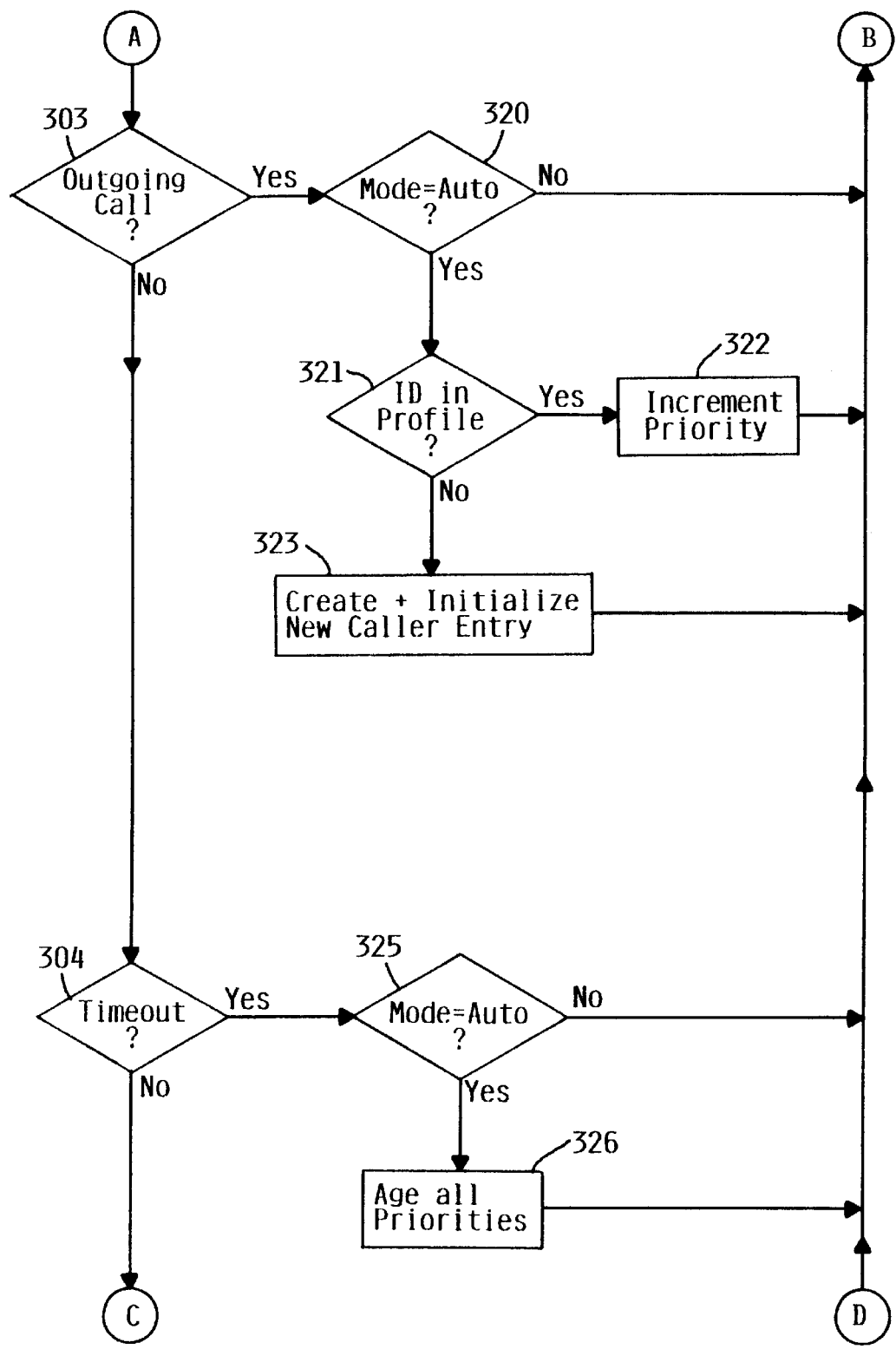
Figure 3B:
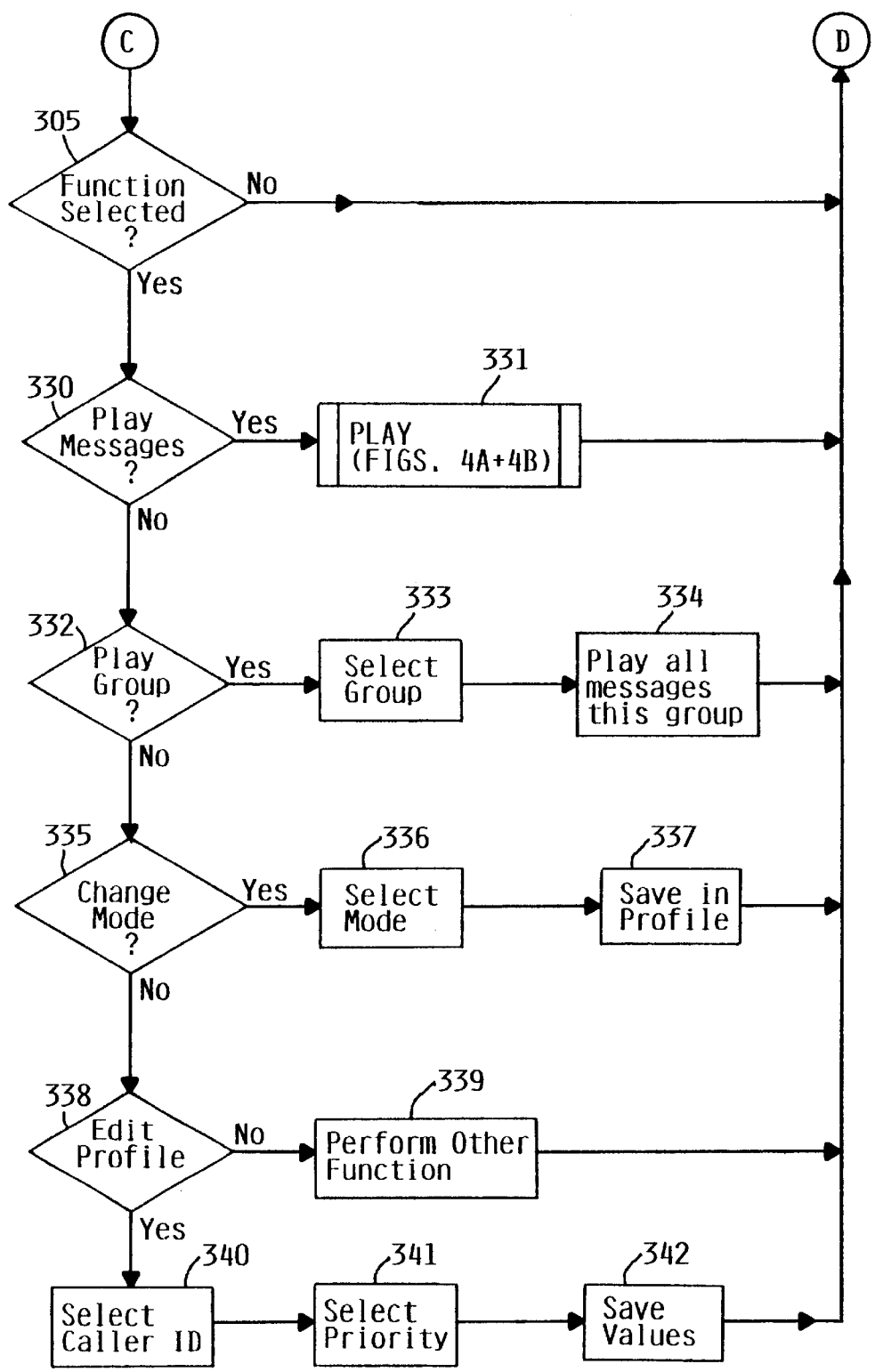

FIGS. 3A and 3B are a flowchart showing the operation at a high level of control program 110 of messaging system 100, according to the preferred embodiment. The system is initially in an idle state 301. In the idle state, the control program waits for an indication of an incoming call, an outgoing call, a function selection by the user, or a timeout of a priority aging timer. This idle loop is represented as steps 302–305, and when any of the above events occurs, the control program leaves the idle loop to perform some action.

As shown in FIG. 3A, if an incoming call is detected on telephone line 120 (the "Y" branch from step 302), the control program checks the mode setting in mode field 203. If mode is set to anything other than "Grouped Auto Prioritize", the "N" branch is taken from step 310. If the mode is set to "Grouped Auto Prioritize", the system is responsible for automatically assigning priorities to caller messages, and the "Y" branch is taken from step 310. The control program then determines whether it is possible to identify the caller using the caller ID function (step 311). If so, the program checks sorting profile 113 for the existence of a corresponding caller entry (step 312). If the caller entry exists, the priority of the entry is incremented (step 313); if the caller entry does not exist, a new caller entry is created and initialized with the caller ID and an initial priority value (step 314). In any of the above cases, the messaging system then waits for the user to take the call. If the user takes the call within some pre-determined time period (the "Y" branch from step 315), the program returns to idle. If the user does not take the call, the system plays a pre-recorded greeting from greeting file 111 (step 316), and then records a message from the caller in message file 112 (step 317). The program then returns to idle.

If an outgoing call is detected (the "Y" branch from step 303), the control program checks the mode setting in mode field 203 (step 320). If the mode is anything other than "Grouped Auto Prioritize", the "N" branch is taken from step 320, and the program returns to idle. If the mode is set to "Grouped Auto Prioritize, the program checks sorting file 113 for the existence of a caller entry corresponding to the destination telephone number of the outgoing call (step 321). If such an entry exists, the priority value is incremented (step 322); if not, a new entry is created for the number of the outgoing call, and its priority set to an initial value (step 323). In either case, the program then returns to idle.

If a timeout of the priority aging timer is detected (the "Y" branch from step 304), then the program checks the mode. If the mode is "Grouped Auto Prioritize", then the system is maintaining priority values, and it is time to age them. In this case, the "Y" branch is taken from step 325, and the priority values are aged, which may also require than some caller entries be deleted if the associated priority values drop below some predetermined threshold (step 326). As explained above, in the preferred embodiment they may be aged by dividing each value by 2, although other forms of aging are possible. The program then returns to idle.

If the user has selected some function (e.g., through a combination of one or more buttons and switches 107), the "Y" branch from step 305 is taken. The handling of four specific functions is illustrated in FIG. 3B, it being understood that the system may support many others. If the function is to play all messages, the "Y" branch from step 330 is taken. In this case, the control program prioritizes the order of messages for presentation to the user and plays the messages over speaker 108 in the determined order. This operation is represented at a high level as step 331 in FIG. 3B, and is shown in greater detail in FIGS. 4A and 4B. After playing all messages, the control program returns to idle.

The user may elect to play only a single group of messages, i.e., messages originating from a single telephone number. If this option is selected by the user, the "Y" branch from step 332 is taken. The user then selects a group of messages to be played (step 333). Since a group is defined by a telephone number, the user may select a group by entering the telephone number of interest, using some combination of buttons and switches 107. Alternatively, the system can scroll through all groups for which there is at least one message, displaying the telephone number of each in display 106. Once the user has selected a group, the system plays all messages in the group in chronological order (step 334), and then returns to idle.

The user may elect to change the ordering mode for playing messages, as illustrated by the "Y" branch from step 335. In this case, the user selects one of the modes above described. Selection may be accomplished by any of various means, e.g., the system cycles the various options and displays each on display 106, allowing the user to select one using an appropriate button. Once a mode has been selected, the new value is stored in mode field 203 of profile 113 (step 337). The control program then returns to idle.

The user may elect to change some caller entry in profile 113, which is illustrated as the "Y" branch from step 338. In this case, the user first selects a group or telephone number (step 340) using any appropriate means, such as the means described above with respect to step 333. The user then inputs an integer priority value (step 341). The control program saves the priority value in the corresponding caller entry of profile 112 (step 342). If no such caller entry exists, the program creates one. The program then returns to idle.

The exact form of input and user selection will vary depending on available hardware and other design considerations, but it is well known that there are many possible ways to input simple numeric values and make selections from a relatively small number of choices. Where the message system is equipped with a numeric keypad (which would, of course, be the case if it contains an integral telephone handset), the simplest form of numeric input is to use the keypad. In other cases, an arrow button and a select button can be used to scroll through a sequence of choices or digits. While this mode of data entry is relatively slow, it is expected that a user will only rarely change the profile or the mode.

Figure 4A:
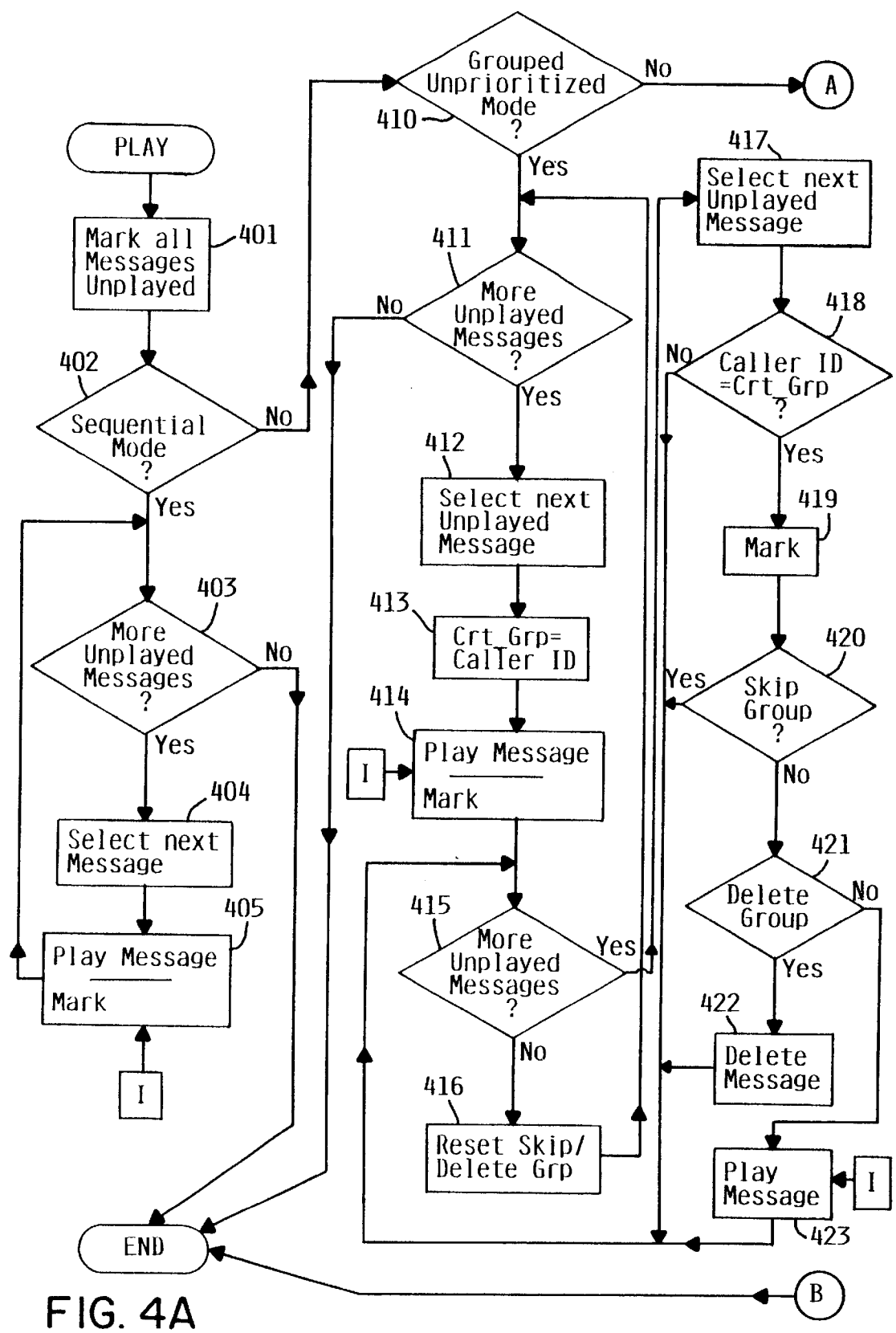
FIGS. 4A and 4B are a flowchart showing in greater the steps performed by the control program during the playback function, according to the preferred embodiment.
Figures 2, 4B:
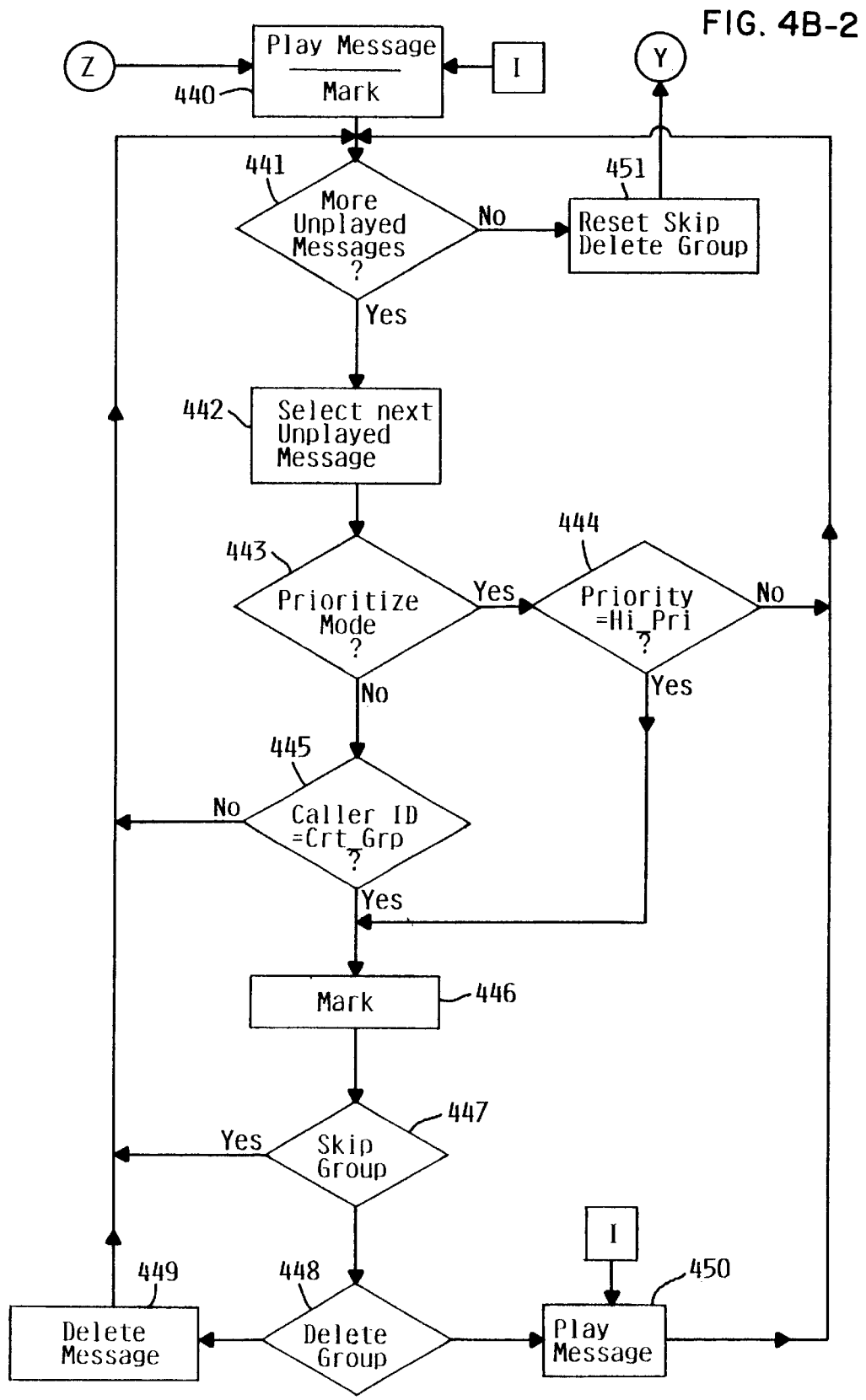

FIGS. 4A and 4B are a flowchart showing in greater the steps performed by the control program during the playback function, i.e., the playing of messages to the user, which is represented in FIG. 3B as the single block 331. In the description below, it is assumed that stored messages have a header containing a pointer to the next sequential (chronological) message, a marker flag indicating whether the message has been played, a caller ID, and other data. Referring first to FIG. 4A, upon entering the playback function all stored messages are marked as unplayed (step 401). The mode field 203 is then examined. If the mode is sequential ("Y" branch from step 402), the control program looks for another unplayed message (step 403), selects the next unplayed message in sequential (chronological) order (step 404), and plays the message, marking it as played (step 405). It then returns to step 403, and when no more unplayed messages remain, it exits the playback function.

During playing of a message, the user may interrupt play to either skip or delete the message. This interrupt capability is shown as an "I" inside a box, pointing to the various play steps. In the case of sequential mode, only a specific message is skipped or deleted. However, in the case of the other modes, the user may elect to skip all messages remaining in a group, or to delete all messages remaining in a group. In this case, a group skip or group delete flag is set.

If the mode is Grouped unprioritized, the "Y" branch from step 410 is taken. In this case, the control program starts at the beginning of the sequential list of messages, and determines if any unplayed messages remain (step 411). If so, the next sequential unplayed message is selected (step 412), and the current group variable (Crt_Grp) is set to the value of the caller ID of the selected message (step 413). The selected message is then played and marked (step 414). Beginning at the selected message, the program then parses the remaining messages in sequence. If there are any remaining unplayed messages (the "Y" branch from step 415), the next sequential unplayed message is selected (step 417). The caller ID of the selected message is then compared with the Crt_Grp variable (step 418). If the two are not equal, the message is not in the same group, and the "N" branch is taken from step 418 to go on to the next message at step 415. If the "Y" branch is taken from step 418, the selected message is marked (step 419). The program then checks the status of the group skip flag, indicating whether an entire group of messages should be skipped (step 420). If the group skip is set, the "Y" branch is taken from step 420, causing the program to skip the selected message and go to step 415 to process the next message. If the group skip is not set, the program checks the group delete flag (step 421). If the group delete is set, the "Y" branch is taken from step 421, causing the selected message to be deleted (step 422), after which the program goes to step 415 to process the next message. If the group delete is not set, the selected message is played (step 423), and the program then goes to step 415 to process the next message. When the end of the message sequence has been reached, the "N" branch is taken from step 415. The group skip and group delete flags are then reset, and the program returns to the top of the message sequence at step 411, to determine the next unplayed message. When no more unplayed messages remain, the "N" branch is taken from step 411, and the playback function terminates.

If the mode is neither sequential nor grouped unprioritized, then the "N" branch is taken from step 410. In this case the mode is either grouped prioritized, grouped auto prioritized, or prioritized. The step followed by the control program are similar, and are illustrated in FIG. 4B.

The program first finds the unplayed message having the highest priority (steps 430–438), this being used to define a set of messages to be played together. Beginning at the start of the message sequence, the program determines whether any unplayed messages remain (step 430). If so, the "Y" branch is taken, and the next unplayed message is selected (step 431). The priority of this message is then determined. by comparing the caller ID of the message with the caller ID fields of the caller entries in profile 113 (step 432). The variable Hi_Pri is then set to the priority value, the Crt_Grp set to the caller ID value, and a selected variable is set to an identifier of the selected message, which may, e.g. be an address (step 433). The program then determines whether any unplayed message remain in the sequence (step 434). If so, the "Y" branch is taken from step 434, and the next unplayed message is selected (step 435). The priority of this message is obtain as it was in step 432 (step 436). This priority is then compared with the Hi_Pri value (step 437). If the priority of the current message is less than or equal to Hi_Pri, the program goes to step 434 to process the next message. If not, the "Y" branch from step 437 is taken, and Hi_Pri is set to the priority of the current message, and the selected and Crt_Grp are updated accordingly (step 438), after which the program goes to step 434 to process the next message. When the entire sequence of messages has been parsed, the "N" branch is taken from step 434; at this point, the Hi_Pri variable contains the highest priority encountered, the selected contains the message ID of the first message having this priority, and Crt_Grp contains the caller ID associated with that message.

The program then plays the selected message and marks it played (step 440). Beginning with the just played message, the program again parses the message sequence for unplayed messages. If any unplayed messages remain, the "Y" branch is taken from step 441. The next unplayed message is then selected (step 442). If the mode is "prioritized", then the "Y" branch is taken from step 443, and the program compares the priority of the just selected message to Hi_Pri (step 444). If the priorities are unequal, the program goes to step 441 to process the next message (the "N" branch from step 444). If the priorities are equal, the mode setting requires that this message be played with all others of the same priority, and the program continues to step 446. If, on the other hand, at step 443, the mode is either "grouped prioritized" or "grouped auto prioritized", the "N" branch is taken from step 443, and the program compares the caller ID of the just selected message to the Crt_Grp variable (step 445). If the two are unequal, the program goes to step 441 to process the next message. If the values are equal, the mode setting requires that this message be played together with all others of the same caller ID, and the program continues to step 446.

At step 446, the selected message is marked. The program then checks the skip group flag (step 447), and if set, the "Y" branch is taken, causing the message to be skipped. The program then checks the delete group flag (step 448) and if set, the "Y" branch is taken, causing the message to be deleted (step 449). If neither flag is set, the message is played (step 450), and the program continues to step 441 to process the next message.

When the entire sequence of messages following a selected high priority message has been traversed, the "N" branch is taken from step 441. The program then resets the group skip and group delete flags (step 451), and returns to step 430. At step 430, the program parses the sequence of messages from the beginning. If no more unplayed messages remain, the "N" branch is taken from step 430, and the playback function ends.

Preferably, the functions described above can be accessed remotely by calling the user's telephone number from another telephone, and entering an appropriate sequence of digits as a security code. The user then enters digits on the keypad of the remote telephone to invoke functions as above described.

As previously explained the caller ID function is used to identify a caller in the preferred embodiment, although voice recognition is an optional form of identification. Where voice recognition is used to identify callers, it will be understood that appropriate changes may be made to the techniques above described for selecting a particular caller to play back messages of the caller, change the caller's priority, and so forth. For example, the system may audibly play a small segment of each caller's speech to allow selection. Alternatively, the user could assign a number to each caller for identification purposes, and simply input the number to make a selection. This number could be a telephone number, or a sequence number (1, 2, 3, etc.), or any other number which might be easy for the user to remember.

In general, the routines executed to implement the illustrated embodiments of the invention, whether implemented as part of a stand-alone message system or an application program of a larger, general purpose system, program, object, module or sequence of instructions, are referred to herein as a "control program" or "program". The programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning message systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disk, hard-disk drives, CD-ROM's, DVD's, magnetic tape, and transmission-type media such as digital and analog communications links, including wireless communications links. Examples of signal-bearing media are illustrated in FIG. 1 as ROM 103.

In the preferred embodiment, messages are grouped according to an identify of a single caller. However, it will be recognized that it would be possible to define more complex groupings of callers and associate priorities accordingly. For example, one could define a group having a limited number of enumerated telephone numbers associated therewith. This would be useful, e.g., where a frequently called person uses several telephones, e.g., at work, at home, cell phone, etc. One could further define a group of numbers according to some characteristic of the numbers. E.g., one might define one group as all telephone numbers beginning with a certain sequence, where the beginning sequence identifies numbers originating from a particular company or organization. Furthermore, one might define as a group all numbers having an origin outside the area code of the user, or even all numbers of foreign origin, on the theory that long distance or international calls probably deserve special treatment.

In the preferred embodiment described above, the telephone message system has been described as a self-contained system operating on a single telephone line. However, it will be understood that the use of caller identification to sort and/or prioritize messages as described herein is equally applicable to larger multi-user systems (sometimes referred to as "phone mail"), in which a single computer stores messages for multiple telephone receivers used by multiple users, and each user retrieves messages from his assigned "mailbox" using appropriate function and numeric buttons on his local telephone receiver.

In the preferred embodiment described above, a telephone answering message system has multiple functions to assist a user in presenting messages in a logical or convenient order. However, it will be understood that it would alternatively be possible to implement a message system with only some of the functions herein described, or to include additional functions not described herein. For example, a message system might have the capability to play back messages associated with a single selected caller identity, even though it lacks the ability to prioritize multiple caller identities as described herein.

Although a specific embodiment of the invention has been disclosed along with certain alternatives, it will be recognized by those skilled in the art that additional variations in form and detail may be made within the scope of the following claims:

What is claimed is:

1. A method of operating a telephone answering message system, comprising the steps of:
    receiving a plurality of telephone messages directed to a user;
    associating caller identifying information with each of said plurality of telephone messages, wherein said caller identifying information comprises identifying data based on voice recognition of the caller's speech;
    automatically generating a respective priority value for each of a plurality of caller identities;
    sorting said plurality of telephone messages using said caller identifying information and said priority value for each caller identity to create a sorted order of said plurality of telephone messages; and
    presenting at least some of said messages to a user in said sorted order.

2. The method of operating a telephone answering message system of claim 1, further comprising the steps of:
    receiving a user command to skip messages associated with a particular caller identity; and
    automatically skipping messages associated with said particular caviler identity responsive to receiving said user command.

3. The method of operating a telephone answering message system of claim 1, further comprising the steps of:
    receiving a user command to delete messages associated with a particular caller identity; and
    automatically deleting messages associated with said particular caller identity responsive to receiving said user command.

4. The method of operating a telephone answering message system of claim 1, further comprising the steps of:
    receiving a user command to play a subset of said plurality of messages, said subset being only those messages associated with a user selected caller identity; and
    playing said subset of said plurality of messages responsive to said user command.

5. The method of operating a telephone answering message system of claim 1, wherein said step of automatically generating a respective priority value of each of a plurality of caller identities comprises automatically generating a priority based on at least one of: (a) a number of incoming calls associated with the respective caller identity, and (b) a number of outgoing calls associated with the respective caller identity.

6. The method of operating a telephone answering message system of claim 1, wherein at least one value of calls associated with a respective caller identity used for generating a priority is periodically aged.

7. A program product for operating a telephone answering message system, said program product comprising a plurality of processor executable instructions recorded on signal-bearing media, wherein said instructions, when executed by a processor, cause the telephone answering message system to perform the steps of:
    receiving a plurality of telephone messages directed to a user;
    associating caller identifying information with each of said plurality of telephone messages, said step of associating caller identifying information comprising identifying a caller based on automated recognition of the caller's voice pattern;
    sorting said plurality of telephone messages using said caller identifying information to create a sorted order of said plurality of telephone messages; and
    presenting at least some of said messages to a user in said sorted order.

8. The program product for operating a telephone answering message system of claim 7, wherein said instructions further cause the telephone answering message system to perform the step of:
    maintaining a plurality of priority values assigned to respective caller identities;
    wherein said step of sorting a plurality of telephone messages uses said plurality of priority values.

9. The program product for operating a telephone answering message system of claim 8, wherein said step of maintaining a plurality of priority values assigned to respective caller identities is performed automatically by said telephone answering message system.

10. The program product for operating a telephone answering message system of claim 7, wherein said instructions further cause said telephone answering message system to perform the steps of:

receiving a user command to skip messages associated with a particular caller identity; and automatically skipping messages associated with said particular caller identity responsive to receiving said user command.

11. The program product for operating a telephone answering message system of claim 7, wherein said instructions further cause said telephone answering message system to perform the steps of:

receiving a user command to delete messages associated with a particular caller identity; and automatically deleting messages associated with said particular caller identity responsive to receiving said user command.

12. The program product for operating a telephone answering message system of claim 7, wherein said instructions further cause said telephone answering message system to perform the steps of:

receiving a user command to play a subset of said plurality of messages, said subset being only those messages associated with a user selected caller identity; and playing said subset of said plurality of messages responsive to said user command.

13. A telephone answering message system, comprising:

a telephone interface;

a memory for storing a plurality of telephone messages received through said telephone interface;

a controller controlling the operation of said telephone answering message system, said controller associating caller identifying information with each of said plurality of telephone messages, automatically generating a respective priority value for each of a plurality of caller identities, and using said caller identifying information and said respective priority value for each of said plurality of caller identities to arrange a presentation of at least some of said messages to the user;

wherein said caller identifying information comprises identifying data based on voice recognition of the caller's speech.

14. The telephone answering message system of claim 13, wherein said controller comprises a programmable processor for executing a control program, and a control program recorded in a read-only non-volatile memory.

15. The telephone answering message system of claim 13, wherein said controller automatically generates a respective priority value of each of said plurality of caller identities based on at least one of: (a) a number of incoming calls associated with the respective caller identity, and (b) a number of outgoing calls associated with the respective caller identity.

16. The telephone answering message system of claim 15, wherein at least one value of calls associated with a respective caller identity used for generating a priority is periodically aged.

17. A method of operating a telephone answering message system, comprising the steps of:

receiving a plurality of telephone messages directed to a user;

associating caller identifying information with each of said plurality of telephone messages, said step of associating caller identifying information comprising identifying a caller based on automated recognition of the caller's voice pattern;

receiving a user selection of a caller identity; and presenting a subset of said plurality of messages to said user responsive to receiving a user selection of a caller identity, said subset being only those messages of said plurality of messages associated with the user selected caller identity.

* * * * *